United States Patent
Fukasawa

(10) Patent No.: US 8,682,112 B2
(45) Date of Patent: Mar. 25, 2014

(54) STORAGE APPARATUS AND METHOD FOR PROCESSING THE SAME

(75) Inventor: Toshihiko Fukasawa, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1571 days.

(21) Appl. No.: 11/683,853

(22) Filed: Mar. 8, 2007

(65) Prior Publication Data

US 2007/0220568 A1    Sep. 20, 2007

(30) Foreign Application Priority Data

Mar. 14, 2006   (JP) .................................. 2006-069412

(51) Int. Cl.
   *G06K 9/54*   (2006.01)
(52) U.S. Cl.
   USPC ........................................... 382/305; 348/439
(58) Field of Classification Search
   USPC ........................................... 382/305; 348/439
   See application file for complete search history.

(56) References Cited

U.S. PATENT DOCUMENTS

| | | | |
|---|---|---|---|
| 6,356,309 B1 * | 3/2002 | Masaki et al. | 348/439.1 |
| 6,424,788 B1 | 7/2002 | Jang | |
| 7,289,684 B2 * | 10/2007 | Nakano et al. | 382/305 |
| 7,530,089 B1 * | 5/2009 | Hayes et al. | 725/95 |
| 8,032,719 B2 * | 10/2011 | Bowers | 711/154 |
| 2004/0183912 A1 | 9/2004 | Szolyga et al. | |

FOREIGN PATENT DOCUMENTS

| | | |
|---|---|---|
| CN | 1035747 A | 9/1989 |
| CN | 1152242 A | 6/1997 |
| CN | 1574929 A | 2/2005 |
| JP | 07-327214 A | 12/1995 |
| JP | 2004-304418 A | 10/2004 |

\* cited by examiner

*Primary Examiner* — Christopher Brown
(74) *Attorney, Agent, or Firm* — Canon USA, Inc., IP Division

(57) ABSTRACT

To alleviate the situation in which image frames cannot be accumulated for a long period of time, a storage apparatus has a controller for decimating transferred data frames prior to performing a predetermined operation on the transferred data frames when the number of data frames stored in a temporary memory exceeds a predetermined number of frames.

14 Claims, 3 Drawing Sheets

STORAGE APPARATUS AND METHOD FOR PROCESSING THE SAME

BACKGROUND OF THE INVENTION

1. Field of the Invention

The present invention relates to storage apparatuses for storing images or the like transferred via a network.

2. Description of the Related Art

A known monitoring system is available in which a camera is placed at a remote place, and an image shot by the camera is transferred to a terminal via the Internet or the like and displayed on a display or accumulated in a storage medium.

A technique similar to such a monitoring system is described in Japanese Patent Laid-Open No. 07-327214. In this document, a display interval between frames is extended when data processing is delayed due to some reasons, and, in the opposite case, the display interval is shortened.

In the monitoring system, when storing an image transferred from the camera in a secondary storage medium such as a hard disk drive, the terminal, which takes into consideration the time required to write the image into the storage medium, stores the image in a temporary memory and then in the storage medium.

However, when the terminal simultaneously receives images transferred from a plurality of cameras, the temporary memory may be short of capacity to store all the images. In such a case, image frames may not be able to be stored in the secondary storage medium for a long period of time.

To overcome the insufficiency in capacity of the temporary memory, image frames stored in the temporary memory may be decimated. However, when one central processing unit (CPU) performs a plurality of operations on the received images, such as storing the received images and performing motion detection on the received images, the load of these operations causes a delay in storing the images. As a result, the capacity insufficiency cannot be fundamentally overcome.

SUMMARY OF THE INVENTION

The present invention alleviates the situation in which image frames cannot be accumulated for a long period of time.

According to an aspect of the present invention, a storage apparatus is provided for storing data frames transferred via a network into a storage medium. The storage apparatus includes a temporary memory configured to temporarily store the transferred data frames when the data frames are directed to be stored in the storage medium; and a controller configured to decimate, when a number of data frames stored in the temporary memory exceeds a predetermined number of frames, the transferred data frames prior to performing a predetermined operation on the transferred data frames, wherein the controller stores the data frames on which the predetermined operation is performed in the temporary memory in order to store the data frames in the storage medium.

According to another aspect of the present invention, the controller increases the frequency of the decimation of the data frames when a predetermined period of time has passed from the start of the decimation. And still further, according to yet another aspect of the present invention, the data frames are image frames, and the predetermined operation is a motion detection operation or a display operation.

Furthermore, according to another aspect of the present invention, a method is provided for processing performed in a storage apparatus for storing data frames transferred via a network into a storage medium. The storage apparatus includes a temporary memory configured to temporarily store the transferred data frames when the data frames are directed to be stored in the storage medium, and a controller configured to decimate the transferred data frames prior to performing a predetermined operation on the transferred data frames. The method includes decimating, by the controller, the transferred data frames prior to performing a predetermined operation on the transferred data frames when the number of data frames stored in the temporary memory exceeds a predetermined number of frames; and storing, by the controller, the data frames on which the predetermined operation is performed in the temporary memory in order to store the data frames in the storage medium.

And, according to yet another aspect of the present invention, a computer readable medium is provided containing computer-executable instructions to be performed in a storage apparatus for storing data frames transferred via a network into a storage medium, the storage apparatus including a temporary memory configured to temporarily store the transferred data frames when the data frames are directed to be stored in the storage medium, and a controller configured to decimate the transferred data frames prior to performing a predetermined operation on the transferred data frames. Here, the computer readable medium includes computer-executable instructions for decimating, by the controller, the transferred data frames prior to performing a predetermined operation on the transferred data frames when the number of data frames stored in the temporary memory exceeds a predetermined number of frames; and computer-executable instructions for storing, by the controller, the data frames on which the predetermined operation is performed in the temporary memory in order to store the data frames in the storage medium.

Further features of the present invention will become apparent from the following description of exemplary embodiments with reference to the attached drawings.

DESCRIPTION OF THE EMBODIMENTS

Embodiments, aspects and features of the present invention will now herein be described.

Figure 1:
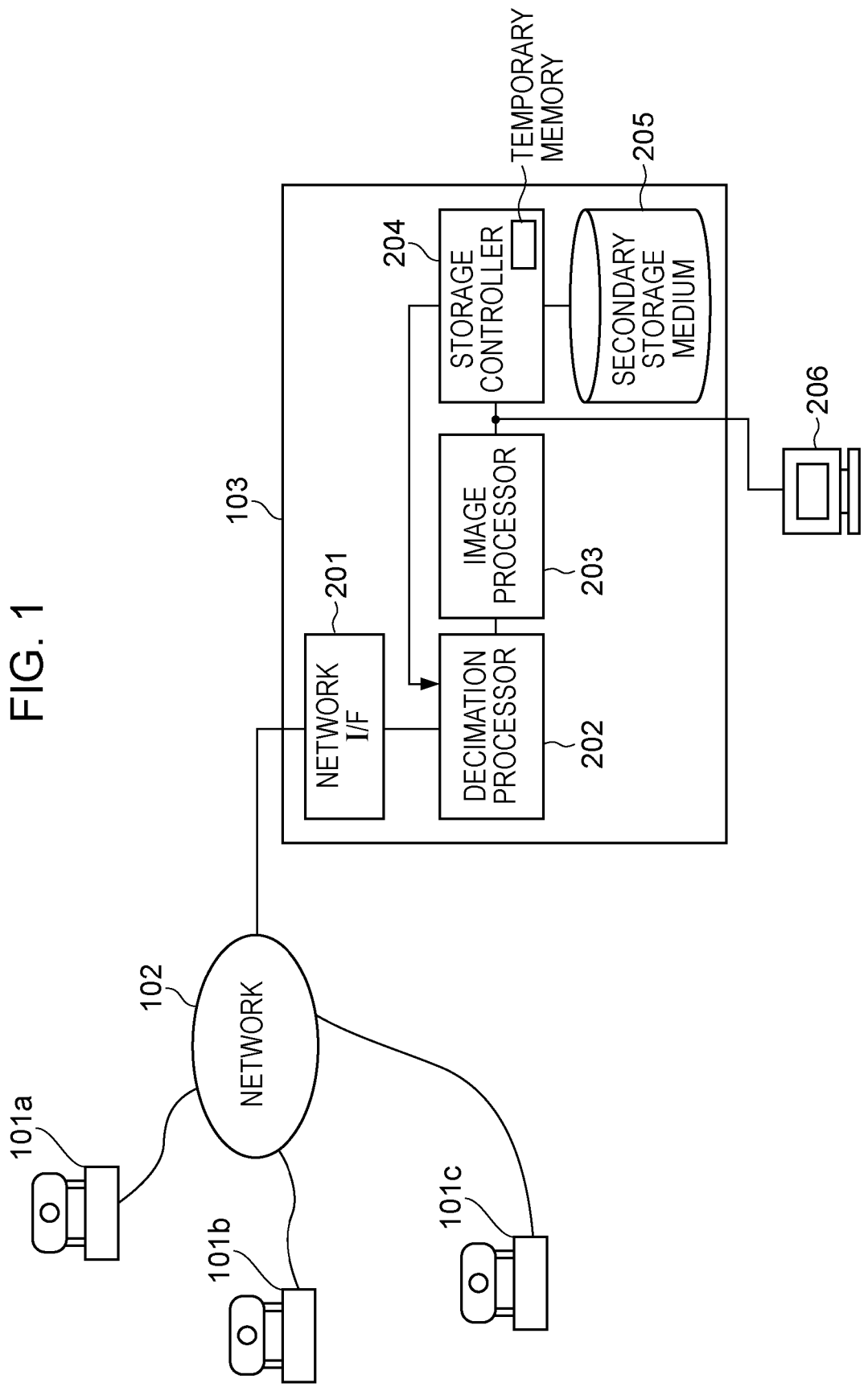
FIG. 1 is a diagram of an example structure of a monitoring system according to an embodiment of the present invention.

FIG. 1 is a diagram of an example structure of a monitoring system according to an embodiment of the present invention. The monitoring system according to the embodiment of the present invention includes cameras 101a to 101c, a network 102 such as the Internet, and a storage apparatus 103 for storing image data transferred from the cameras 101a to 101c.

The storage apparatus 103 includes a network interface 201, a decimation processor 202, an image processor 203, a storage controller 204, and a secondary storage medium 205. In addition, a display 206, such as a liquid crystal display (LCD), displays an image processed by the image processor 203. In the following description, image data is represented in units of frames.

The network interface 201 is a circuit for receiving image frames transferred via the network 102. The decimation processor 202 decimates the image frames in accordance with a command from the storage controller 204.

In accordance with a command from the storage controller 204, the decimation processor 202 decimates the image frames input via the network interface 201. Specifically, when the decimation processor 202 receives a command from the storage controller 204, the decimation processor 202 decimates the image frames once every K times, that is, at a ratio of one to K (for example, K is a natural number greater than or equal to ten). When the decimation processor 202 receives a command from the storage controller 204, the decimation processor 202 increases the frequency of decimation and decimates the image frames twice every K times, that is, at a ratio of two to K, for example. The frequency of decimation of image frames may be increased in any way as long as consecutive image frames are not decimated, if possible.

The image processor 203 obtains image data from which the image frame decimated by the decimation processor 202 is removed, performs motion detection on the obtained image, and displays the image. Specifically, the image processor 203 performs motion detection by adding an identifier for identifying an image frame in which motion is detected by an inter-frame difference algorithm to such an image frame. The image processor 203 performs a display operation by decoding image frames and outputting the decoded image frames to the display 206.

The storage controller 204 has a temporary memory that can store a predetermined number A of image frames. The storage controller 204 first stores the image frames in the temporary memory and then stores the image frames stored in the temporary memory in the secondary storage medium 205. When the number of image frames A stored in the temporary memory exceeds a threshold Y (Y<X where X and Y are natural numbers), the storage controller 204 outputs a command for instructing the decimation processor 202 to decimate the image frames.

The secondary storage medium 205 is a storage medium such as a hard disk that can store a large number of image frames.

Operations performed by the decimation processor 202, the image processor 203, and the storage controller 204 are executed by one CPU.

Figure 2:
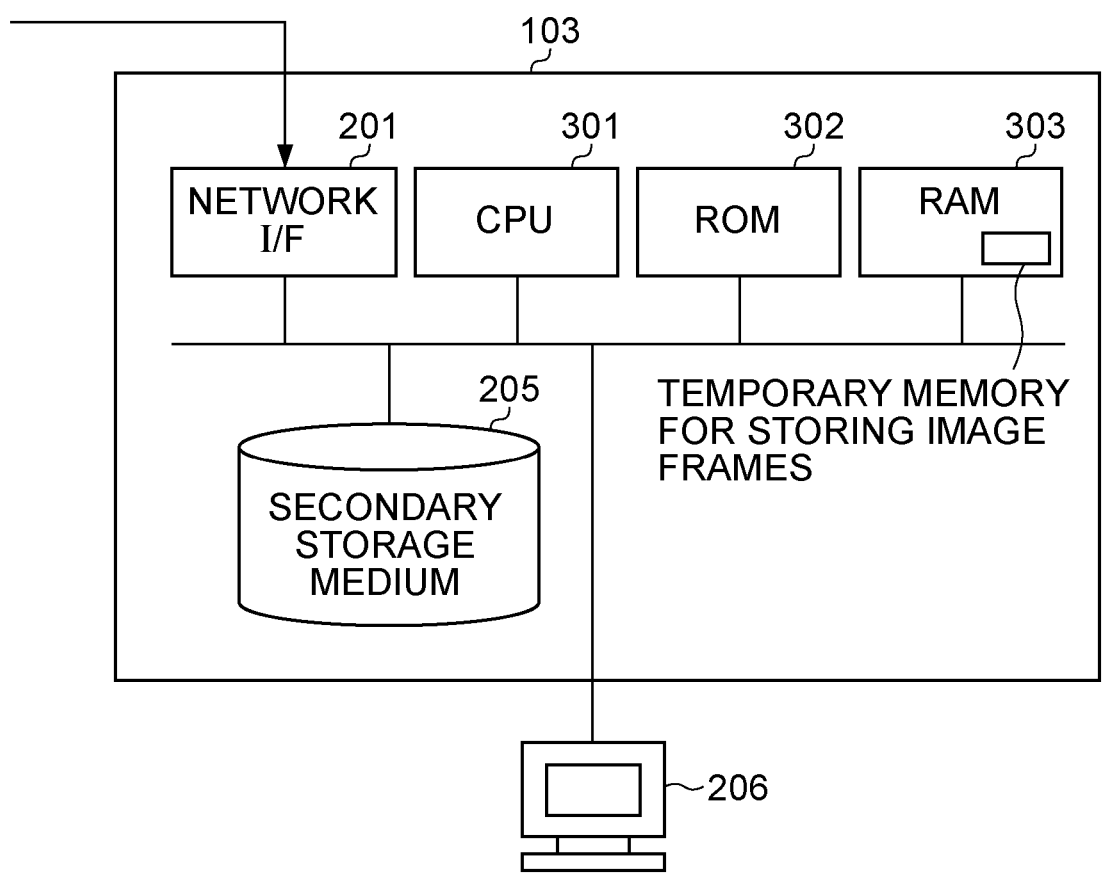
FIG. 2 is a hardware block diagram of an example storage apparatus according to the embodiment of the present invention.

FIG. 2 is a diagram of an example hardware structure of the storage apparatus 103. The same reference numerals as shown in FIG. 1 denote the same components, and descriptions thereof are omitted. A CPU 301 is a controller for controlling the storage apparatus 103. A read only memory (ROM) 302 stores a program for allowing the CPU 301 to control the storage apparatus 103. A random-access memory (RAM) 303 is a memory for expanding the program read from the ROM 302 and processing image frames. The RAM 303 has, as a temporary memory, a storage area for temporarily storing image frames. In the embodiment, X image frames can be stored in the storage area.

On the basis of the program read from the ROM 302, the CPU 301 executes the operations performed by the decimation processor 202, the image processor 203, and the storage controller 204 shown in FIG. 1.

Figure 3:
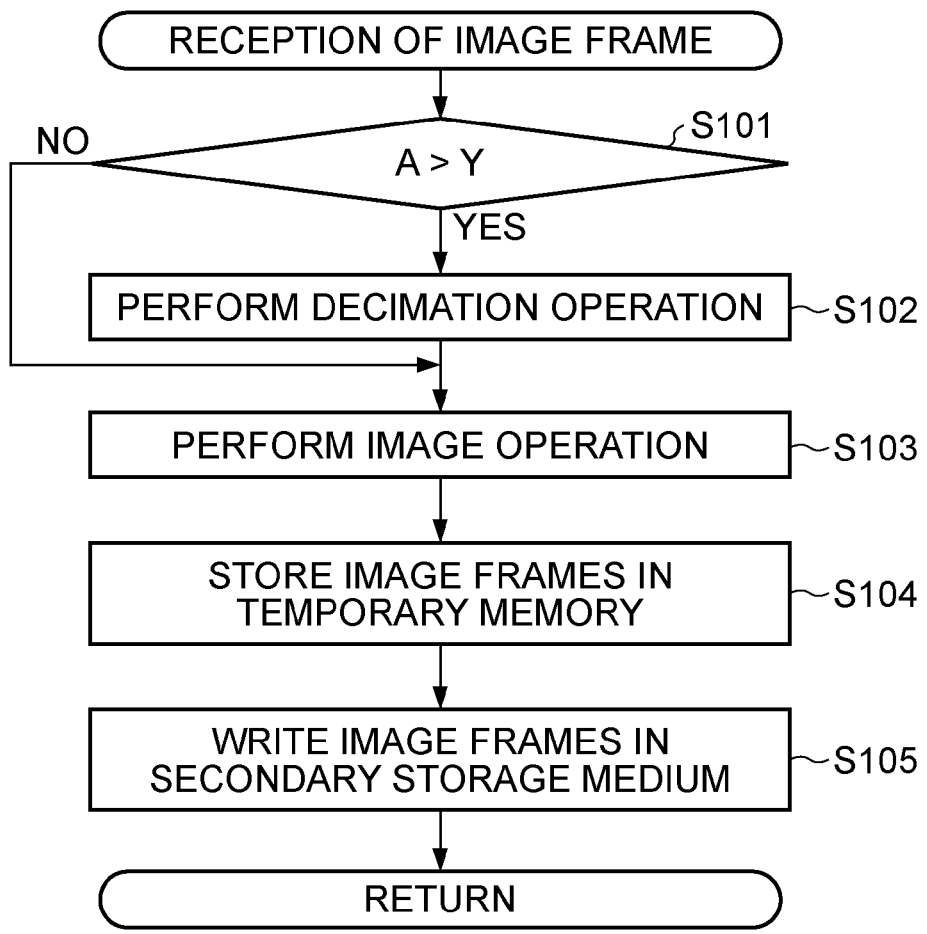
FIG. 3 is a flowchart of an example operation of the storage apparatus according to the embodiment of the present invention.

FIG. 3 is a flowchart of an example operation of the storage apparatus according to the embodiment in the case of reception of image frames. The operation shown in FIG. 3 is executed by the CPU 301 on the basis of the program read from the ROM 302.

When the CPU 301 receives an image frame via the network interface 201, the CPU 301 determines whether the number of image frames A stored in the temporary memory exceeds the threshold Y (S101).

When it is determined in step S101 that the number of image frames A stored in the temporary memory exceeds the threshold Y, the CPU 301 decimates the received image frame (S102). Specifically, the CPU 301 discards the received image frame once every K times, that is, at a ratio of one to K. In contrast, when it is determined in step S101 that the number of frames A stored in the temporary memory does not exceed the threshold Y, the CPU 301 proceeds to step S103. If the decimation is being performed, the CPU 301 ends the decimation.

In step S103, the CPU 301 performs the above-described motion detection on the decimated image frames and displays the image. When the number of image frames A stored in the temporary memory does not exceed the threshold Y, the CPU 301 performs image processing on all the received image frames.

Although the number of image frames serves as the threshold in step S101 of FIG. 3, the amount of data may serve as a threshold. In this case, the parameter A in step S102 becomes the total amount of data of the image frames stored in the temporary memory, and the parameter Y in step S102 serves as the amount of data serving as a threshold.

In step S104, the CPU 301 first stores the image frames in the temporary memory, counts the number of stored frames A, and maintains the number A in the RAM 303. The temporary memory is a partial storage area of the RAM 303. This partial storage area can store X image frames. In step S105, the CPU 301 writes the image frames stored in the temporary memory into the secondary storage medium 205.

As shown in the flowchart of FIG. 3, the transferred image frames are decimated prior to performing image processing. Thus, the load on the CPU 301 is alleviated, and the image frames can be appropriately stored in the secondary storage medium 205.

Figure 4:
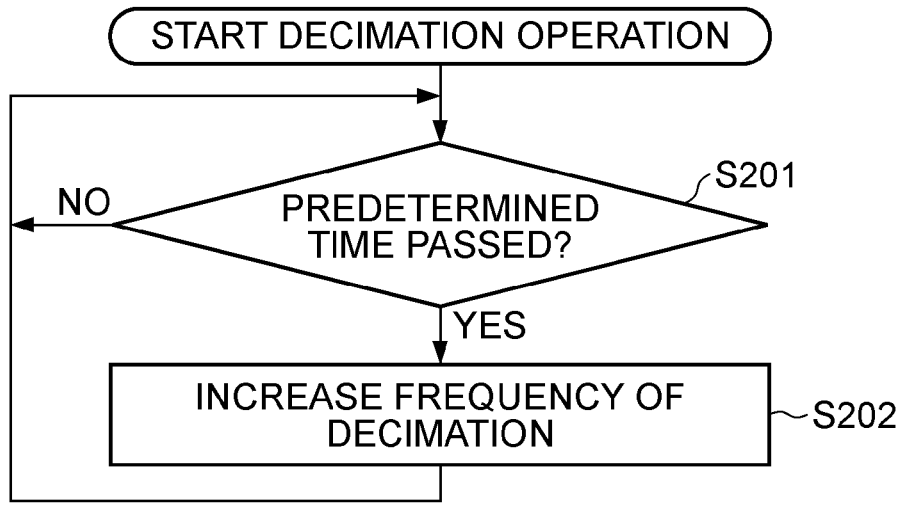
FIG. 4 is a flowchart of an example operation of the storage apparatus according to the embodiment of the present invention.

FIG. 4 is a flowchart of a decimation operation performed by the CPU 301 in step S102 of FIG. 3. In the embodiment, the CPU 301 has a timer function. At the start of the decimation operation (S101 of FIG. 3), the CPU 301 starts measuring time. The decimation ratio at the start of the decimation operation is one to K, that is, the transferred image frame is discarded once every K times.

In step S201, the CPU 301 determines whether a predetermined period of time T has passed since the start of the decimation operation. When the predetermined period of time T has passed in step S201, the CPU 301 proceeds to step S202.

In step S202, the CPU 301 determines that the load of processing the image frames is still high and increases the frequency of decimation of image frames. For example, the CPU 301 decimates the image frames twice every K times, that is, at a ratio of two to K. When the frequency of decimation is increased, the time measurement is reset, and the CPU 301 starts measuring time again. When the predetermined period of time T has passed again, the CPU 301 further increases the frequency of decimation and decimates the image frames three times every K times, that is, at a ratio of three to K.

The operation shown in FIG. 4 ends when it is determined in step S101 of FIG. 3 that the number of image frames stored in the temporary memory is less than or equal to Y.

As has been described above, according to the storage apparatus of the embodiment, the load on the CPU 301 can be reduced, and hence the situation in which the number of image frames stored in the temporary memory is increasing can be alleviated as quickly as possible. That is, according to the embodiment, a fear that the image frames cannot be accumulated for a long period of time can be greatly mitigated.

Although the decimation of image frames has been described in the embodiment, the present invention is also applicable to the case where audio frames serving as audio data are transferred. In this case, instead of the function of the image processor 203, an audio processor for performing audio detection, audio recognition, and audio output is employed. Instead of the display 206, a speaker serving as an audio output device is connected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-069412 filed Mar. 14, 2006, which is hereby incorporated by reference herein in its entirety.

What is claimed:

1. A storage apparatus to receive data frames transferred via a network and store processed data frames in a storage medium, the storage apparatus comprising:
   a processor device configured to perform predetermined processing on data frames received by the storage apparatus from the network to produce processed data frames;
   a temporary memory configured to temporarily store data frames; and
   a controller device configured to delete data frames received by the storage apparatus from the network before the processor device performs predetermined processing on the data frames, wherein, in response to a number of processed data frames stored in the temporary memory exceeding a predetermined number of frames, the controller device deletes some of the data frames received by the storage apparatus from the network and the processor device performs the predetermined processing on those data frames received by the storage apparatus from the network and not deleted by the controller device,
   wherein the controller device stores those data frames on which the processor device has performed the predetermined processing in the temporary memory, and then performs a storing processing to move the processed data frames in the temporary memory into the storage medium, and
   wherein the data frames are image frames, and the predetermined processing performed on the data frames other than the deleted data frames is a motion detection processing or a decoding processing.

2. The storage apparatus according to claim 1, wherein the controller device increases a frequency of the deletion of the data frames in response to a predetermined period of time passing from a start of the deletion.

3. The storage apparatus according to claim 1, wherein the controller device stores the data frames other than the deleted data frames in the temporary memory after the predetermined processing is performed on the data frames other than the deleted data frames.

4. A storage apparatus to receive data frames transferred via a network and store processed data frames in a storage medium, the storage apparatus comprising:
   a processor device configured to perform predetermined processing on data frames received by the storage apparatus from the network to produce processed data frames;
   a temporary memory configured to temporarily store data frames; and
   a controller device configured to delete data frames received by the storage apparatus from the network before the processor device performs predetermined processing on the data frames, wherein, in response to an amount of data of processed data frames stored in the temporary memory exceeding a predetermined amount of data, the controller device deletes some of the data frames received by the storage apparatus from the network and the processor device performs the predetermined processing on those data frames received by the storage apparatus from the network and not deleted by the controller device,
   wherein the controller device stores those data frames on which the processor device has performed the predetermined processing in the temporary memory, and then performs a storing processing to move the processed data frames in the temporary memory into the storage medium, and
   wherein the data frames are image frames, and the predetermined processing performed on the data frames other than the deleted data frames is a motion detection processing or a decoding processing.

5. The storage apparatus according to claim 3, wherein the controller device stores the data frames other than the deleted data frames in the temporary memory after the predetermined processing is performed on the data frames other than the deleted data frames.

6. A method of processing performed in a storage apparatus to receive data frames transferred via a network and store processed data frames in a storage medium, wherein the storage apparatus includes a controller device configured to delete data frames received by the storage apparatus from the network before a processor device performs predetermined processing on the data frames, the method comprising:
   performing, via the processor device, predetermined processing on data frames received by the storage apparatus from the network to produce processed data frames;
   temporarily storing, in a temporary memory, data frames; and
   wherein, in response to a number of processed data frames stored in the temporary memory exceeding a predetermined number of frames, deleting some of the data frames received by the storage apparatus from the network and performing the predetermined processing on those data frames received by the storage apparatus from the network and not deleted by the controller device,
   wherein the controller device stores those data frames on which the processor device has performed the predetermined processing in the temporary memory, and then performs a storing processing to move the processed data frames in the temporary memory into the storage medium, and
   wherein the data frames are image frames, and the predetermined processing performed on the data frames other than the deleted data frames is a motion detection processing or a decoding processing.

7. The method according to claim 6, wherein deleting includes increasing a frequency of the deletion of the data frames in response to a predetermined period of time passing from a start of the deletion.

8. A non-transitory computer readable medium storing a program that causes a storage apparatus to perform the method according to claim 6.

9. The method according to claim 6, wherein the data frames other than the deleted data frames are stored in the temporary memory after the predetermined processing is performed on the data frames other than the deleted data frames.

10. The non-transitory computer readable medium according to claim 8, wherein the data frames other than the deleted data frames are stored in the temporary memory after the predetermined processing is performed on the data frames other than the deleted data frames.

11. A method of processing performed in a storage apparatus to receive data frames transferred via a network and store processed data frames in a storage medium, wherein the storage apparatus includes a controller device configured to delete data frames received by the storage apparatus from the network before a processor device performs predetermined processing on the data frames, the method comprising:

performing, via the processor device, predetermined processing on data frames received by the storage apparatus from the network to produce processed data frames;

temporarily storing, in a temporary memory, data frames; and wherein, in response to an amount of data of processed data frames stored in the temporary memory exceeding a predetermined amount of data, deleting some of the data frames received by the storage apparatus from the network and performing the predetermined processing on those data frames received by the storage apparatus from the network and not deleted by the controller device, wherein the controller device stores those data frames on which the processor device has performed the predetermined processing in the temporary memory, and then performs a storing processing to move the processed data frames in the temporary memory into the storage medium, and wherein the data frames are image frames, and the predetermined processing performed on the data frames other than the deleted data frames is a motion detection processing or a decoding processing.

12. A non-transitory computer readable medium storing a program that causes a storage apparatus to perform the method according to claim 11.

13. The method according to claim 11, wherein the data frames other than the deleted data frames are stored in the temporary memory after the predetermined processing is performed on the data frames other than the deleted data frames.

14. The non-transitory computer readable medium according to claim 12, wherein the data frames other than the deleted data frames are stored in the temporary memory after the predetermined processing is performed on the data frames other than the deleted data frames.

* * * * *